Oct. 31, 1944.   G. A. LYON   2,361,406
WHEEL ASSEMBLY
Filed Sept. 8, 1941   2 Sheets-Sheet 1
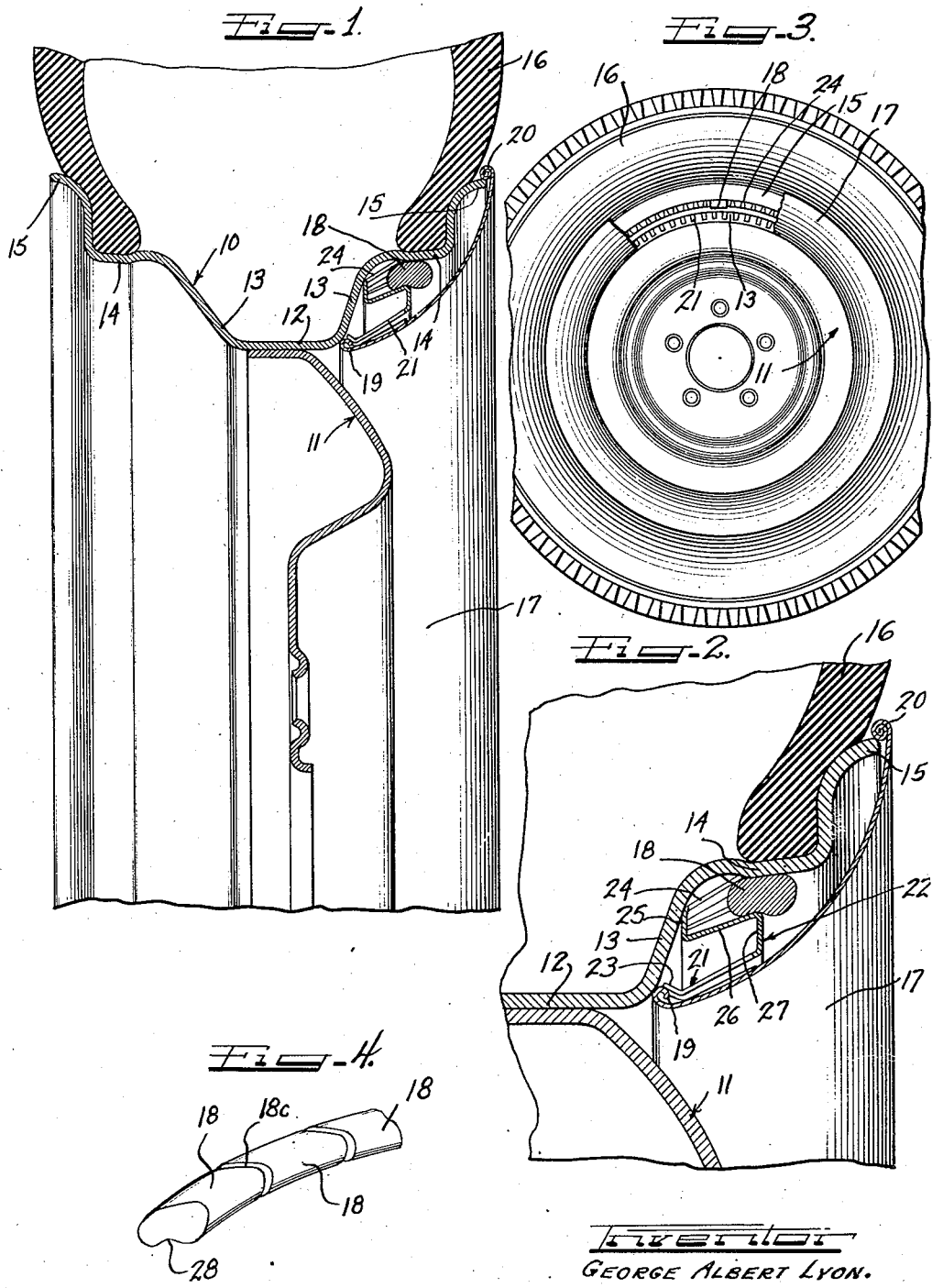
INVENTOR
GEORGE ALBERT LYON.

Oct. 31, 1944. G. A. LYON 2,361,406
WHEEL ASSEMBLY
Filed Sept. 8, 1941 2 Sheets-Sheet 2
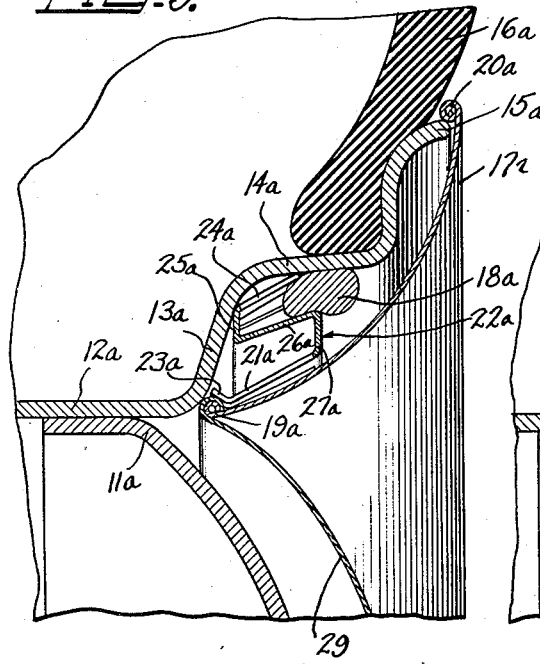
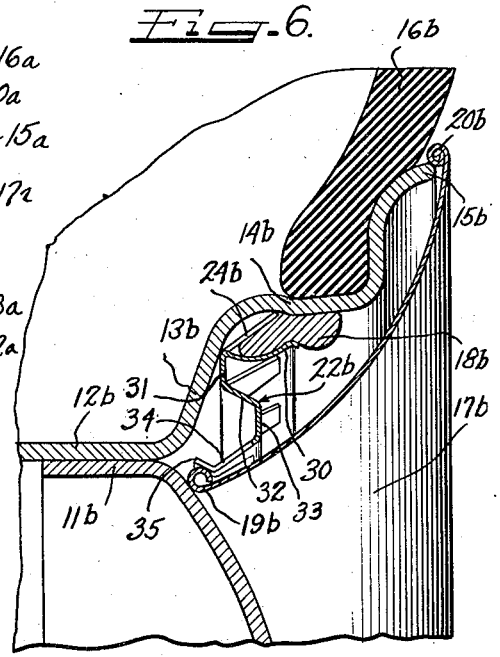
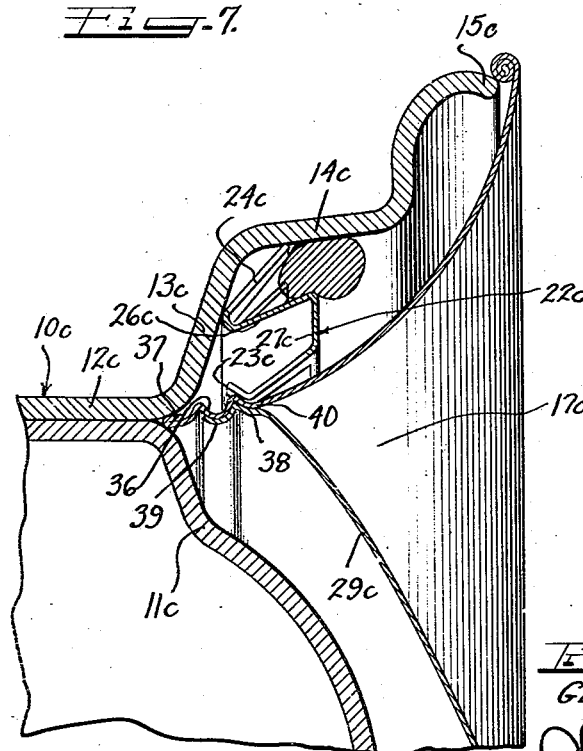
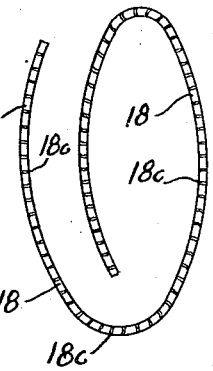
Inventor
GEORGE ALBERT LYON.
by
Attys Patented Oct. 31, 1944

2,361,406

UNITED STATES PATENT OFFICE 2,361,406

WHEEL ASSEMBLY

George Albert Lyon, Allenhurst, N. J.

Application September 8, 1941, Serial No. 409,992

12 Claims. (Cl. 301—37)

This invention relates to improvements in wheel structures and more particularly to means for mounting ornamental wheel disks together with wheel balancing weight elements, securely to the wheel structure.

In appending accessory parts such as wheel balancing weights and ornamental trim rings and disks to a wheel structure it is highly important, first, that these appended parts be readily insertable and removable, preferably with a snap-on, pry-off engagement, second, that when so attached these parts be held securely but removably with relation to the wheel assembly thereby to eliminate rattling and vibration of the parts and slippage thereof from their intended positions. Furthermore it is important particularly, in the case of a wheel balancing weight that it not only be readily insertable and removable but that it be adjustable along a concentric path with respect to the wheel structure without removal of either the weight itself or the retaining means which holds it in place and that once placed in its adjusted position on this path it be securely held there against accidental sliding.

To the end that the above difficulties may be overcome and advantages obtained and as an important object of the invention, there is provided herein an improved wheel structure including retaining means which is constructed to engage both an ornamental trim ring and a wheel balancing weight or weights in snap-on and pry-off relationship.

A further object of the invention is to provide in a wheel construction, an assembly for retaining a wheel balancing weight or weights in snap-on, pry-off relationship wherein the weight may be inserted and removed without removing the retaining means.

A still further object of the invention is to provide a wheel construction with retaining means which is provided with inherent resiliency to receive a grooved weight in locked relationship and to receive an ornamental disk in snap-on, pry-off relationship.

A still further object of the invention is to provide in an improved wheel structure, retaining means for a wheel balancing weight which affords circumferential adjustment of the weight without removing the retaining means or removing the weight from the assembly and further provided with means for engaging the weight to prevent accidental circumferential sliding thereof when the assembly of the weight or weights with the wheel structure is completed.

Still another object of the invention is to provide an improved wheel balancing weight configurated to fit securely in the wheel assembly and adjacent the retaining means in snap-on and pry-off relationship and to provide an improved method of manufacturing these weights whereby the desired configuration of each individual weight is automatically obtained in the manufacturing procedure and whereby the weights may be manufactured in long lengths and scored or otherwise weakened at intermediate points to facilitate the removal of individual weights from the manufactured lengths thereof.

In accordance with the general features of this invention, there is provided a retaining element which is secured to the wheel rim and which is constructed and arranged to afford inherent cross-sectional resiliency whereby it may be sprung into eccentricity with the wheel assembly to afford snap-on engagement of a grooved wheel balancing weight and whereby it may spring back into concentricity with the wheel assembly to engage in grooves in the weight for holding the same in locked position against the wheel rim. This retaining member is further provided with resilient means which coact with an ornamental wheel disk to retain the same on the wheel assembly in snap-on, pry-off relationship, the resilient coaction between the retaining means and the ornamental disk augmenting the retention of the wheel balancing weights in operative position.

Another feature of the invention is the provision of an improved wheel balancing weight configurated to more efficiently cooperate with the retaining means provided herein in that the weight is grooved to receive the retaining means and is configurated arcuately to provide a flush engagement with the portion of the wheel rim against which it bears, this grooved and arcuate configuration being provided automatically in the manufacturing operations by rolling the weights in long lengths and in spiral form thereby imparting to each the arcuate configuration desired. There is also provided in the lengths of weights manufactured as above described, weakened cross-sectional areas whereby the individual weights may be easily removed from the long lengths without the use of tools or cutting mechanisms.

Other objects and advantages of the invention will become apparent from the following description and the accompanying drawings, in which:

Figure 1 represents a fragmentary cross-sectional view of a wheel structure embodying one form of the invention;

Figure 2 represents a fragmentary enlarged view of a portion of Figure 1;

Figure 3 represents a fragmentary side elevation of a wheel construction embodying the invention, part of the ornamental member being broken away to show the disposition of the retaining member and the associated wheel balancing weight;

Figure 4 is a fragmentary perspective view of the wheel balancing weights prior to their separation for use;

Figure 5 is a fragmentary cross-sectional view of a wheel construction showing a modified form of the invention;

Figure 6 is a fragmentary cross-sectional view of a wheel construction showing a further modification embodying the invention;

Figure 7 is a fragmentary cross-sectional view of a wheel construction showing a still further modified form of the invention; and Figure 8 is a perspective view of the wheel balancing weight in the form of a spiral length.

It is to be understood that the embodiments herein are for illustrative purposes and may be changed or modified without departing from the spirit and the scope of the invention as set forth in the appended claims.

I have illustrated in the drawings a number of modifications of my invention, in each of which there is provided a retaining member adapted to engage with the wheel rim and to hold the wheel balancing weights and ornamental wheel disks in their respective positions in snap-on, pry-off relationship. In the modifications shown the retaining member is constructed and arranged to afford inherent cross-sectional resiliency for facilitating the snap-on and pry-off action of the weights and ornamental members. Furthermore in the modifications shown the weights are preferably grooved to cooperate with the retaining member and are provided with an arcuate configuration whereby they conform to the configuration of the parts between which they are secured.

Referring to the drawings, particularly to the modified forms shown in Figures 1 and 2, the reference character 10 designates generally a drop center rim of a wheel which includes a body part 11 secured thereto as by welding or the like. The rim 10 is provided with a base flange 12, opposite side flanges 13, opposite intermediate flanges 14 and opposite edge portions 15, a suitable tire 16 being shown mounted in operative position upon the rim.

As is well known by those skilled in the art, the increased efficiency and the higher speeds of modern motor vehicles render a wheel which is unbalanced upon its axle, more detrimental to the efficient operation of the car. Furthermore, in addition to the reduction in the efficiency of the operation of the vehicle, with regard to wear of parts, gas mileage and the like, this unbalanced condition renders the operation of the vehicle at such high speeds dangerous in that it causes the wheels, particularly those affected by the steering gear, to shimmy, with the result that vehicles from time to time become uncontrollable by the operator. To the end that the above conditions may be eliminated and the wheel brought into a state of perfect balance, those skilled in the art have found that the addition of small weights to the wheel at proper points reestablishes the desired balance. These weights, however, must be moved from time to time since the state of balance obtained by the addition thereof to the wheel structure is lost after the tires begin to wear in an uneven manner. It is therefore highly desirable that these weights be attachable and detachable with great ease and yet securely, and that they be available for adjusting movement without requiring complicated manipulation and the use of tools to any great extent.

It has also been found that the addition of these weights to readily accessible portions of the wheel structure renders that structure unsightly and unsymmetrical and it is therefore highly desirable that they be associated in an assembly in which they are concealed and therefore do not detract from the appearance of the assembly.

In order that the latter advantage be attained it is contemplated that the wheel balancing weights be concealed behind an ornamental trim ring designated as 17 in Figures 1, 2 and 3, this trim ring, like the weights, designated as 18 in Figures 1, 2 and 3, being mounted in the wheel assembly for ready detachment to render the weights accessible for adjustment.

The trim ring 17 as shown is formed with a generally arcuate cross section, its convex surface being disposed outwardly of the wheel assembly when it is mounted thereon. The inner and outer peripheral edges of the ring 17 are beaded as at 19 and 20, the bead 20 being provided by a multiplicity of turns to the end that greater strength and rigidity are imparted to the outer peripheral edge thereof. When the trim ring 17 is mounted in the wheel assembly, the bead 20 is disposed adjacent the respective edge portion 15 of the wheel rim while the bead 19 is urged past the body of the resilient fingers 21 of a retaining member 22 to be more fully described presently.

As will be seen from Figure 2, the retaining ring 22 is of general S shape cross section and is secured in the wheel structure by outwardly extending finger members 24 which are adapted to spring into engagement with the undersurface of the intermediate flange 14 of the rim to bite into the metal of the rim and thus prevent removal of the ring 22 from the wheel assembly. The fingers 21 are provided with an elongated body portion and terminate in upturned end portions 23, the junction between the elongated portion and the end portions constituting a corner past which the bead 19 must be urged as it is forced into its ultimate position. It will be readily understood that when the trim ring 17 is urged axially inwardly and the bead 19 is thus forced beyond the above-mentioned corner of the resilient fingers 21, the ring 17 will be securely maintained in a position wherein it extends substantially between the junction of the body member 11 with the rim 10 and the edge portion 15 of the rim, thereby covering the major portion of the rim to present a neat and attractive appearance. It will also be readily understood that when so secured to the rim, the ring 17 may be easily and quickly removed from the assembly merely by prying the bead 19 outwardly under the resilient fingers 21 which will yield as the bead 19 passes the corner junction between the elongated portion of the fingers and the end portion 23 thereof.

As previously stated, the weight 18, like the trim ring 17 is preferably associated with the wheel assembly in snap-on, pry-off relationship and accordingly, this retention of the weight 18 is also accomplished by means of the retaining ring 22.

As will be shown presently, the retaining ring is so constructed and arranged that the retention of the weight 18 and the trim ring 17 thereby urges parts thereof resiliently toward one another whereby the presence of the weight 18 and the trim ring 17 in operative position causes the retaining member 22 to react upon the other to provide augmented locking engagement. To this end the inner ends of the fingers 24 terminate in an inwardly radially disposed flange 25, the radially outer edge of which abuts the flange 13 of the rim to maintain the member 22 in ultimate position. The flange 25 in turn terminates in an axially outwardly disposed flange 26 which extends radially outwardly toward the surface of the rim and with the flange 27 and the fingers 21 forms a resilient re-entrant configuration which is adapted to spring radially outwardly about the flange 25 and its junction with the flange 26 to maintain the wheel balancing weight 18 in operative position, as will be described presently. Similarly, as previously explained, the fingers 21 are adapted to spring resiliently inwardly to engage the bead 19 of the trim ring 17.

By reference to Figure 4, the preferable shape of the wheel balancing weight 18 will be seen. As previously explained, these weights each are formed with an arcuate longitudinal configuration and additionally there is provided in each a groove 28 which extends longitudinally of the individual weight. While of course the specific shape of the weights may be considerably varied to conform to the configuration of the various known shapes of tire rims, it is highly desirable that each weight be provided with a longitudinal section of reduced dimension whereby it may be urged between the rim and the junction of flanges 26 and 27 of the retaining member 22 to urge the same into eccentricity with the wheel assembly as the thicker cross section of the weight passes between the rim and the adjacent portion of the retaining member 22 and whereby, when the groove 28 is engaged by the retaining member, the latter may spring back into concentricity with the wheel assembly due to the reduced dimensions afforded by the groove. It will be readily understood that with such a construction the weight is securely locked into its ultimate position by the engagement of the retaining member 22 in the groove 28.

After the weight 18 is inserted in the wheel assembly as above described the trim ring 17 may be secured thereto by snap-on engagement between the bead 19 and the resilient fingers 21. As previously explained, such engagement causes a radial outward movement of the fingers 21 and thus the entire re-entrant portion of the retaining member is likewise urged in that direction. As a result of this resilient movement of the fingers 21 by the bead 19, the re-entrant section of the retaining member 22 will be urged generally radially outwardly into tight engagement in the groove 28 of the weight 18 thereby to hold the latter securely in position. Similarly the tension of the fingers 21 against the bead 19 will be increased by the presence of the weight in its operative position.

It is also important that once the weight is placed in the desired position to balance the wheel, it be prevented from slipping along the space between the wheel rim and the retaining means. In the present embodiment this slippage is prevented by the presence of the retaining fingers 24 which provide spaced slots, as will be seen in Figure 3, into which the weight may embed itself to be retained securely in the desired position.

From the foregoing it will be seen that I have provided a wheel construction wherein a single retaining element is utilized to retain both the trim ring 17 and the wheel balancing weight 18 in a desired position; wherein the wheel balancing weight may be inserted or removed from the construction without removing retaining means; wherein the retaining means and the wheel balancing weight are concealed by a neat and attractive appearing trim ring; wherein the trim ring is likewise maintained in its proper position by a snap-on, pry-off engagement and wherein the snap-on engagement of the wheel balancing weight in the trim ring serves to maintain the other with increased security in its ultimate position.

The construction shown in Figure 5 is similar to that shown in Figures 1 and 2 except that the ornamental wheel disk 29 is shown having a peripheral bead interlocked with the bead 19a of the trim ring 17a. Thus with this construction the wheel balancing weight 18a is inserted in the desired position by urging it between the flange 14a of the tire rim and the retaining member 22a whereby the latter is temporarily moved into eccentricity with the wheel structure. It then returns to a position concentric therewith when it engages in the groove of the weight. Thereafter, the tire rim and retaining ring assembly together with the body portion 11a is entirely concealed from view by movement of the bead joint between the trim ring 17a and the wheel disk 29 across the resilient fingers 21a.

In Figure 6 of the drawings there is shown a modified form of retaining member 22b and a modified wheel balancing weight 18b.

In this construction the retaining member 22b includes retaining fingers 24b similar to those previously described in connection with Figures 1, 2 and 5. However, in the present case the fingers are stamped out of the flange 30 to engage the radially inner surface of the flange 14b of the wheel rim. A flange 31 is formed integrally with the flange 30 and the radially inner edge thereof terminates in a reentrant cross-sectional portion including flanges 32 and 33 and resilient fingers 34 which terminate in bent portion 35 as explained in connection with the previous modification.

By reference to Figure 6 it will be seen that the weight 18b is formed with an upper surface (as viewed in the figure) adapted to abut the radially inner surface of the flange 14b of the tire rim, an angularly disposed surface adapted to abut the resilient fingers 14b and a groove adapted to receive the resilient flange 30. With such a construction the weight is snapped into position and is there held securely by the flush engagement of the above described surfaces with the cooperating parts of the wheel rim, retaining ring assembly. It will also be seen that while the resilient fingers 34 securely engage the bead 19b of the trim ring 17b, the re-entrant section of the retaining ring, as in the previous construction, provides a yielding construction whereby the insertion of the weight 18b moves the entire ring into eccentricity with respect to the wheel construction until the weight is in proper position whereupon the ring returns to concentricity to hold the weight in position.

In the modified form shown in Figure 7 the retaining ring 22b is similar to that shown in Figures 1, 2 and 5. The ring includes the retaining fingers 24c and the re-entrant cross section portion including flanges 26c, 27c and fingers 21c. In this form of the device, however, the trim ring 17c is provided with its inner peripheral margin formed into corrugations 40 and 36, the peripheral edge thereof extending axially inwardly and being bent back upon itself as at 37. There is also provided in this form of the invention an ornamental wheel disk 29c having its peripheral margin formed into corrugations 38 and 39 adapted to conform to the figurations of corrugations 40 and 36 of the trim ring and to interfit therewith in snap-on relationship. In this construction the insertion of a wheel balancing weight is similar to that shown in the forms heretofore described. The trim ring 17c is maintained in its operative position by engagement of the inner wall of the corrugation 40 with the portion 23c of the fingers 21c and the position of the trim ring is further maintained by the abutment of the inner peripheral edge thereof in the corner formed by the junction of the body part 11c and the tire rim 10c.

As previously explained, the weights 18 are preferably formed with a longitudinal arcuate configuration and with grooves on at least one side thereof. To the end that this arcuate configuration and groove formation may be obtained by means of a minimum of manufacturing operations thereby to reduce the cost of the weights it is contemplated that they be made from lead or the like and rolled into long lengths, the rollers being so positioned that the completed lengths of weight assume a spiral form thereby imparting to each individual weight the desired arcuate longitudinal configuration. Furthermore, to the end that the weights may be easily separated from the lengths provided without necessitating a cutting operation, the lengths of weight may be scored or otherwise weakened at spaced points as at 18c in Figures 4 and 8. Thus it will be seen that as the individual weights are needed, they may be removed from the spiral length by bending or twisting with the hands.

From the foregoing it will be seen that there is provided herein an improved method of manufacturing wheel balancing weights which provides a construction of the desired shape and configuration and which requires a minimum of manufacturing operations and expense. Furthermore, the weights are manufactured in convenient form for shipping and may be easily removed individually for use from the spiral lengths provided.

There is also provided herein a novel wheel construction including a novel retaining ring which retains both an ornamental disk and a wheel balancing weight and which affords insertion and removal of both the trim ring and the wheel balancing weight with a minimum of manipulation.

What I claim is:

1. The combination with a wheel structure having a tire rim, of a retaining member secured to said rim, a wheel balancing weight engaged by said retaining member in snap-on, pry-off relationship and an ornamental member disposed outwardly over said retaining member and said weight in snap-on, pry-off relationship with said retaining member.

2. In a wheel structure having a tire rim, the combination of a wheel balancing weight, an ornamental member and a common retaining ring secured to said rim for holding said weight and said member in desired positions relative to said rim in detachable engagement.

3. As a new article of manufacture, a retaining ring for a wheel assembly including substantially, axially disposed retaining fingers for securing the ring to a tire rim by biting into the adjacent surface of the latter, substantially axially disposed resilient fingers for engaging a wheel ornament in snap-on, pry-off engagement and a re-entrant formed intermediate cross-sectional portion between said retaining fingers and said resilient fingers.

4. As a new article of manufacture, a retaining member for a wheel assembly including means for securing said member to a tire rim, means for receiving a wheel ornament in snap-on, pry-off engagement and a portion formed in re-entrant configuration in cross section to impart resiliency in a cross-sectional plane of the member whereby a wheel balancing weight may be securely retained between the member and the adjacent surface of the tire rim.

5. As a new article of manufacture, an annular retaining member for a wheel assembly including means for securing said member to a tire rim, means at the inner periphery thereof for receiving the wheel ornament in snap-on, pry-off engagement and resilient portion disposed substantially axially thereof for engaging a wheel balancing weight.

6. As a new article of manufacture, an annular retaining member for a wheel assembly having means for securing said member to a tire rim, means for receiving a wheel ornament in snap-on engagement and a portion formed to impart resiliency thereto whereby said member may be sprung into eccentricity with respect to a wheel rim on which it is mounted and may return to a position of concentricity to engage a wheel balancing weight.

7. As a new article of manufacture, an annular retaining member for a wheel assembly including means for engaging an ornamental wheel member in snap-on, pry-off engagement, a plurality of substantially axially, outwardly disposed fingers for engaging the adjacent surface of a wheel rim to secure the retaining member thereon and a substantially outwardly, axially disposed resilient flange for engaging a wheel balancing weight to urge the same against said rim and against said fingers as they engage the rim.

8. In a wheel construction having a tire rim, in combination, a wheel ornament including an annular trim ring and a wheel disk, the outer periphery of the disk and the inner periphery of the ring being grooved to conform to the configuration of one another, a wheel balancing weight and a retaining member, said member including means for resiliently engaging the radially outer surface of said grooved portion of said ornamental member in snap-on, pry-off engagement and means for urging said weight against the tire rim in snap-on, pry-off engagement.

9. In a wheel construction having a tire rim, in combination, a wheel ornament including a trim ring and a central disk portion a hump formed at the junction of said ring and said disk, a wheel balancing weight and a retaining ring, said ring having a means for securing it to the rim, means for resiliently engaging said hump in snap-on, pry-off engagement, and resilient means for urging said weight in snap-on, pry-off engagement against the trim ring.

10. The combination with a wheel structure having a tire rim, of retaining means secured to the rim, an ornamental member disposed outwardly over said retaining member in snap-on, pry-off relationship, a wheel balancing device and means for securing said wheel balancing device to said tire rim in concealed relationship thereagainst, beneath said ornamental member.

11. As an article of manufacture, a retaining member for securing a wheel balancing weight to a wheel structure, said retaining member including a wheel engaging portion arranged to secure the retaining member to the wheel structure with which it is associated, and a resilient, weight engaging portion arranged to be disposed in spaced relation to an adjacent portion of the outer surface of the wheel and to define therewith a receptacle accessible from the outer side of the wheel and the retaining member for detachably receiving a wheel balancing weight, into which a weight may be inserted and from which it may be removed without necessitating the removal of the retaining member from the wheel.

12. In a wheel construction having a tire rim, the combination of a grooved wheel balancing weight; an annular retaining member having means for securing it to the rim and having means for resiliently engaging the wheel balancing weight to urge it against the adjacent surface of the rim in assembled relationship, said means imparting resiliency to said annular retaining member whereby the latter may be urged into eccentricity with the rim to allow insertion of the weight in operative position and whereby it may spring back into concentricity when the resilient means engages the groove in said weight; and an ornamental wheel member on said retaining means.

GEORGE ALBERT LYON.